United States Patent Office 3,065,225
Patented Nov. 20, 1962

3,065,225
N',N⁴-DI-ISOXAZOLYLCARBONYL-SULFANIL-
AMIDE DERIVATIVES
Thomas Samuel Gardner, Rutherford, John Lee, Montclair, and Edward Wenis, Leonia, N.J., assignors to Hoffmann-La Roche Inc., Nutley, N.J., a corporation of New Jersey
No Drawing. Filed Feb. 5, 1960, Ser. No. 6,840
5 Claims. (Cl. 260—239.9)

This invention relates to novel chemical compounds. More particularly, it relates to novel heterocyclic compounds characterized particularly in that they are sulfanilamides substituted in N⁴-position by a lower alkyl-isoxazolylcarbonyl radical. In preferred aspects of the invention, the lower alkylisoxazolylcarbonyl radical is either a 3-methyl-5-isoxazolylcarbonyl radical or a 5-methyl-3-isoxazolylcarbonyl radical. In references herein to the isoxazolyl structure, the numbering system employed is that shown as System No. 88 in "The Ring Index," by Patterson and Capell (1940).

The novel compounds of the invention are useful as medicinal agents, more particularly as diuretic agents, and are characterized especially by marked diuretic and natriuretic action.

A preferred embodiment of the invention relates to compounds which can be represented by the general formula (I)
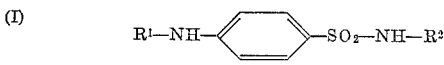

wherein R¹ stands for a member of the group consisting of 3 - methyl - 5 - isoxazolylcarbonyl and 5 - methyl -3-isoxazolylcarbonyl and R² stands for a member of the group consisting of hydrogen, 3-methyl-5-isoxazolylcarbonyl and 5-methyl-3-isoxazolylcarbonyl.

The novel compounds of the invention can be made by processes which comprise reacting a lower alkylisoxazolylcarbonyl halide, e.g., 3-methyl -5-isoxazolylcarbonyl chloride or bromide, or 5-methyl-3-isoxazolylcarbonyl chloride or bromide, with sulfanilamide.

The invention is further disclosed in the following examples, which are illustrative but not limitative thereof. Temperatures are stated in degrees centigrade, corrected.

*Example 1*

To a 5-liter round bottom flask are added 370 g. of dry sulfanilamide and 1,000 g. of pyridine. The solution is cooled to minus 10° by an acetone-solid carbon dioxide (Dry Ice) bath. A solution of 260 g. of 3-methyl-5-isoxazolylcarbonyl chloride in 1,200 g. of pyridine at 30° is added slowly to the solution of sulfanilamide in pyridine over a period of 1½ hours. The sulfanilamide solution meanwhile, by stirring and cooling, is kept at minus 5° to 0° until all of the acid chloride solution has been added. After about ½ hour of stirring and during the addition of the acid chloride solution, the product begins to separate from the pyridine solution. The flask is at that time placed in an ice bath and is held at 0° for 18 hours, with stirring. The separated product is removed by filtration and washed twice with water. The recovered grey product is air-dried. Yield, 280 g.

The crude product is recrystallized from glacial acetic acid in a 2% solution, with decolorization with activated carbon (Norite), as follows: A boiling solution of glacial acetic acid, containing 20 g. of the crude product in 1,000 g. of glacial acetic acid, and 10 g. of Norite-A (decolorizing charcoal) is filtered through a heated funnel by gravity. The acetic acid solution is cooled and the product readily separates and is recovered by filtration. The recovered wet product is washed twice with cold water. The material is air-dried for at least 24 hours and then dried over P₂O₅ in vacuum. Yield, 230 g. (46%) of N⁴ - (3-methyl-5-isoxazolylcarbonyl) sulfanilamide, M.P. 263–265° at 10°/min. rate of heating and 258–260° at 3°/min. rate of heating.

Similarly, by reacting 3-ethyl-5-isoxazolylcarbonyl chloride with sulfanilamide, there is obtained N⁴-(3-ethyl-5-isoxazolylcarbonyl) sulfanilamide.

*Example 2*

100 g. of 3-methyl-5-isoxazolylcarbonyl chloride is dissolved in 1,000 g. of dry pyridine cooled to 0° by an ice bath. To this solution is added 119 g. of dry sulfanilamide in portions over a period of ½ hour. The temperature is then allowed to rise to room temperature and the suspension is stirred overnight. The suspension is filtered. The solid separating (30 g.) is primarily the N⁴-mono substituted compound.

The pyridine mother liquor is diluted with 2 kg. of ice and water and the pH adjusted to 4 using concentrated hydrochloric acid. The separated solid (48 g.) is primarily the N¹,N⁴-bis substituted compound. Recrystallization from glacial acetic acid gives the purified N¹,N⁴-bis (3-methyl-5-isoxazolylcarbonyl) sulfanilamide, M.P. 294–295°.

The bis compound is less soluble in acetic acid than the mono substituted product.

*Example 3*

34 g. of 5-methyl-3-isoxazolylcarbonyl chloride is added to 500 ml. of dry pyridine cooled by an ice bath. To this solution is added 36 g. of sulfanilamide. Complete solution takes place and after about 15 minutes, a precipitate starts to come out. The solution is stirred overnight at 0° and the precipitate is filtered off and recrystallized from ethanol; yield 12 g. of N⁴-(5-methyl-3-isoxazolylcarbonyl) sulfanilamide, M.P. 270–271°.

Similarly, by reacting 5-ethyl-3-isoxazolylcarbonyl chloride with sulfanilamide, there is obtained N⁴-(5-ethyl-3-isoxazolylcarbonyl) sulfanilamide.

We claim:
1. Sulfanilamide substituted in N⁴ position by lower alkyl-isoxazolylcarbonyl.
2. A compound represented by the formula

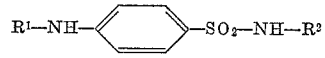

wherein R¹ stands for a member of the group consisting of 3-methyl-5-isoxazolylcarbonyl and 5-methyl-3-isoxazolylcarbonyl; and R² stands for a member of the group consisting of hydrogen, 3-methyl-5-isoxazolylcarbonyl and 5-methyl-3-isoxazolylcarbonyl.
3. N⁴-(3-methyl-5-isoxazolylcarbonyl) sulfanilamide.
4. N¹,N⁴-bis (3-methyl-5-isoxazolylcarbonyl) sulfanilamide.
5. N⁴-(5-methyl-3-isoxazolylcarbonyl) sulfanilamide.

References Cited in the file of this patent
FOREIGN PATENTS
598,472 Great Britain _____ Feb. 19, 1948

OTHER REFERENCES
Crossley et al.: Journ. Am. Chem. Soc., vol. 61, pp. 2950–55 (1939).
Daniels et al.: Journ. Am. Chem. Soc., vol. 62, pp. 741–2 (1940).
Daniels et al.: Journ. Am. Chem. Soc., vol. 63, pp. 257–8 (1941).
Northey: The Sulfonamides and Allied Compounds, Reinhold Pub. Corp., N.Y., pages 128–129 (1948).
Northey: The Sulfonamides and Related Compounds, Reinhold Pub. Corp., N.Y., pages 224 to 228 (1948).